United States Patent
Paull, Jr.

[15] 3,672,507
[45] June 27, 1972

[54] FILTER APPARATUS AND METHOD

[72] Inventor: Henry Paull, Jr., Rte. 4, Box 334, Appleton, Wis. 54911

[22] Filed: April 20, 1970

[21] Appl. No.: 30,103

[52] U.S. Cl. ............................210/77, 210/186, 210/387, 210/499
[51] Int. Cl. ........................................................B01d 29/02
[58] Field of Search..................210/387, 184, 186, 340, 400, 210/77, 461, 499, 455

[56] References Cited

UNITED STATES PATENTS

| | | | |
|---|---|---|---|
| 1,953,289 | 4/1934 | Cohen | 210/387 |
| 3,121,681 | 2/1964 | Baxter | 210/340 X |
| 1,181,729 | 5/1916 | Brown | 210/184 |
| 1,627,186 | 5/1927 | Lalor | 210/340 |

Primary Examiner—J. L. DeCesare
Attorney—Dressler, Goldsmith, Clement & Gordon

[57] ABSTRACT

An apparatus and method for filtering hot fluid material including a filter system having a filter formed from a continuous screen passing through a closed cavity through which the material flows. The cavity is defined by a cover and bottom member having sealing members which engage the screen to define the filter portion of the screen disposed within the cavity. The filter may be changed rapidly without cooling of the filter unit simply by loosening the bottom from the cover thereby releasing the screen and pulling the screen through the cavity until a clean portion thereof is disposed in position to be engaged by the sealing members to form a filter therefrom.

11 Claims, 7 Drawing Figures

PATENTED JUN 27 1972

INVENTOR
Henry Paull Jr.
BY Dressler, Goldsmith, Clement & Gordon
ATTORNEYS

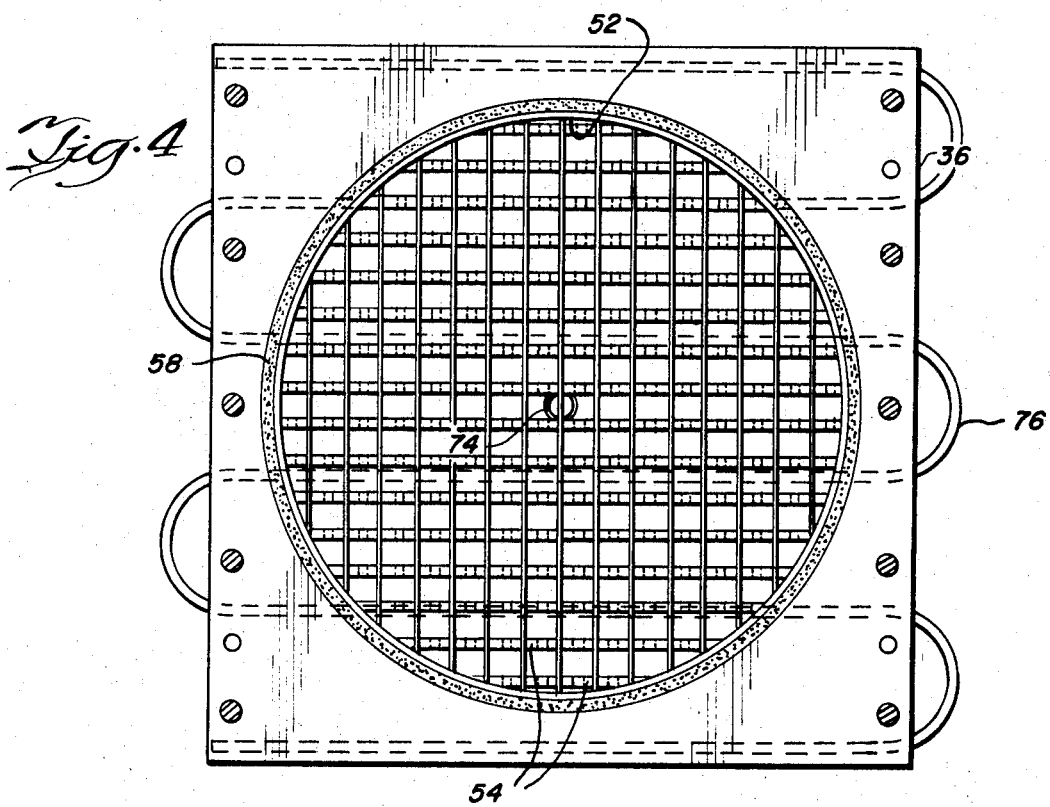
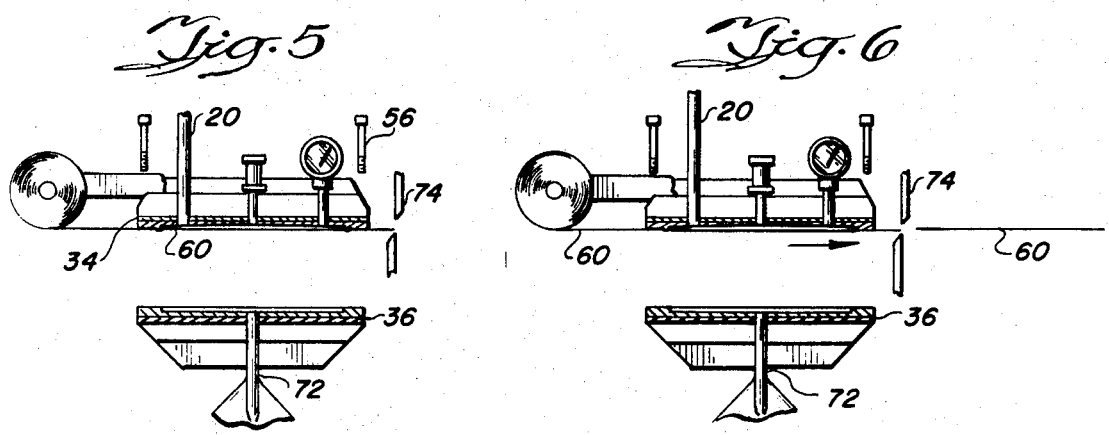
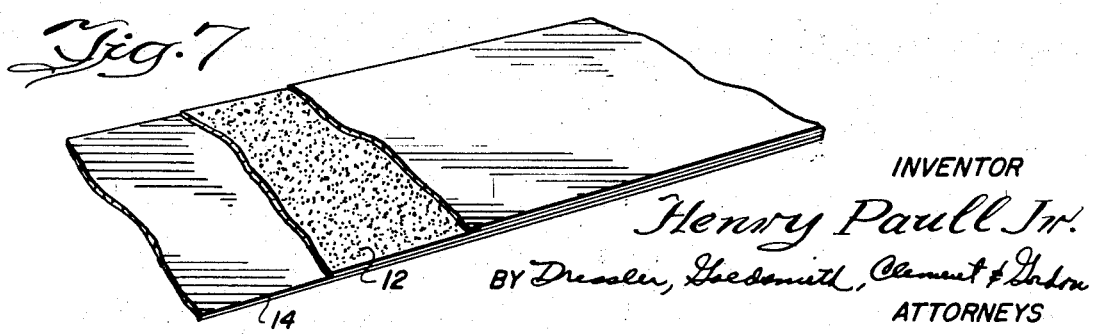

FILTER APPARATUS AND METHOD

BACKGROUND

A large variety of sheet products such as paper, foil, film and wood are coated with various types of high temperature, high melting point films such as, for example, asphalt and polypropylene. Typical of such products in wide use are laminated sheets of paper, foil, or wood, such as, reinforced gummed tapes and reinforced films.

Coating of these materials typically has been done by means of roll coating, Meyer rod application or the dipping of the sheet to be coated. These procedures all have distinct deficiencies and limitations.

For example, roll coating requires medium to low viscosities, typically 2,000 centipoises or below. Furthermore, in roll coating of materials, there is limited control of cross sheet coat weight and, typically roll coating apparatus operate at relatively low speeds.

Meyer rod coating procedures have limitations similar to those associated with roll coating, and, in addition, may be used with only a limited number of materials, since the use of the rod is particularly hard on light weight or delicate materials.

One alternative to the above procedures is to utilize extrusion methods for coating. When utilized to apply a coating to a continuous web of material, the rates for extrusion coating are typically limited by the capabilities of the web handling apparatus and by the rate of feed of material to the extruder. Extrusion coating apparatus should be capable of operating at rates of about 1,000 feet per minute or more.

Extrusion procedures can result in much finer control of the coating materials can be applied at optimum and uniform temperatures. As a result, the coating thickness can be more stringently controlled, eliminating bleeding through the material being coated, reducing waste, and preventing excess of the material from spreading beyond the edges of the coated web during laminating, if a laminated product is being produced. Furthermore, a wide range of controlled coating weights can be utilized.

Satisfactory extrusion coating, however, necessitates the use of a narrow slot through which the coating is extruded. When the slot is narrow enough to cause the desired pressure drop through the extrusion orifice, an even coating may be obtained along the entire length of the slot, i.e., along the entire width of the substrate being coated. Many constituents in such coating materials are often of a size to prevent their passage through the orifice. In many instances, the orifice becomes clogged rapidly, and as a result, skips in the coatings and scratches on the material being coated soon become evident.

Because of these "impurities" in the coating material, it becomes necessary to filter the coating material before it passes through the extrusion orifice onto the web being coated. Unfortunately, existing filters are not suitable for this application. Because of the characteristics of the coating materials, filters disposed in the path of the hot material tend to clog up very rapidly.

For example, when asphalt, one of the more common coating materials, is used, the filter begins to clog within a period of about one hour and before long passage of the coating material through filter and, therefore, through the extrusion nozzle substantially ceases. It is quite apparent, that under these conditions, production line extrusion coating cannot proceed satisfactorily.

Furthermore, replacement of existing type filters is quite difficult. Dur to extrusion temperatures, typically in the range of 300° to 400° F, existing filters are almost impossible to handle until temperatures are reduced, and at that point, such units tend to "freeze up" as the coating material "solidifies."

BRIEF DESCRIPTION OF INVENTION

In accordance with the present invention, there is provided an apparatus and method for filtering hot material. One advantageous application of the apparatus and method of the present invention is its utilization for filtering extrusion coating material on a production basis to effect continuous production line extrusion coating.

In accordance with one disclosed embodiment of the present invention there is provided a sealed filtering unit through which is passed a web of screen. The filter unit seals the periphery of a portion of the screen disposed therewithin to define the filter. A plurality of filter support wires permit the pressurized extrusion through the filter screen.

When the filter becomes clogged, the filtering unit is opened and the screen is drawn therethrough until a clean portion of the screen is positioned with the unit. Upon closure of the unit to seal a new portion of the screen within the unit, a new filter is formed and extrusion may be resumed.

This rapid replacement of the filter can be effected without an undue reduction of the temperature, since it is only the edge of the screen that requires handling. In order to permit continuous operation without temperature reduction, a plurality of filter units can be disposed in parallel, with the coating material being passed alternately through one filter while the coating material is being changed.

Numerous other advantages and features of the present invention will become readily apparent from the following detailed description of the invention and of one embodiment thereof, from the claims and from the accompanying drawings in which each and every detail shown is fully and completely disclosed as a part of this specification, in which like numerals refer to like parts.

Figure 2:
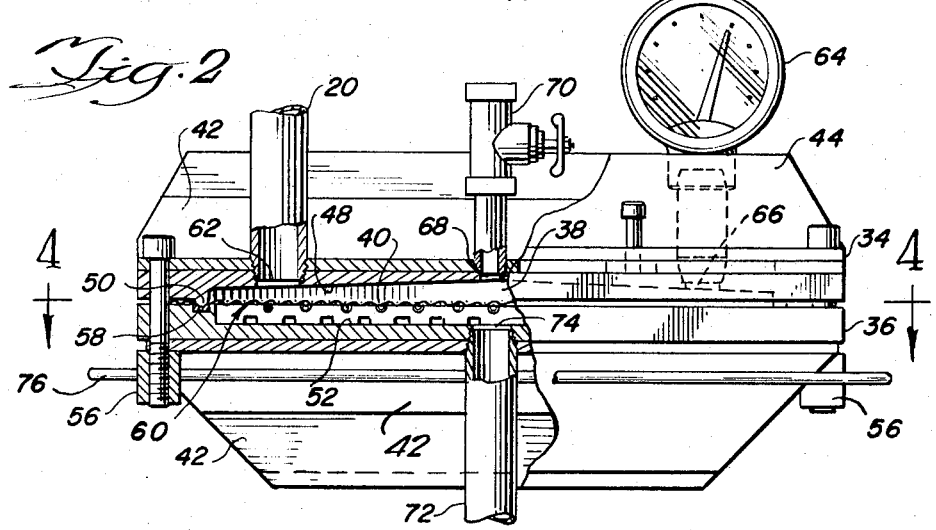
FIG. 2 is a side view of the filter unit, partially in section.

FIG. 4. is a sectional view of the filter unit taken along line 4—4 of FIG. 2;

FIGS. 5 and 6 are diagrammatic views illustrating the mothod of operation of the present invention; and FIG. 7 is a perspective view of a laminated product of the type produced by use of coatings such as provided by the present invention.

Figure 1:
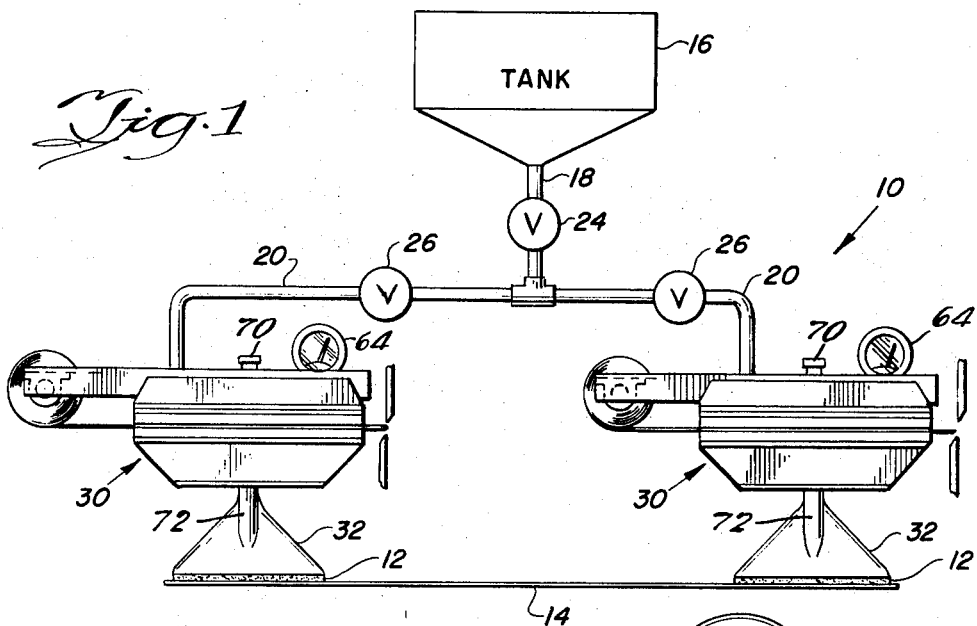
FIG. 1 is a diagrammatic view of an embodiment of an extrusion system incorporating the filter units of the present invention.

In FIG. 1 there is shown a system 10 for extruding high temperature films or coatings 12 onto a web 14 of material such as paper, foil or wood, in combination, if desirable, with reinforcing material such as yarn string, fiber and the like. The system includes a reservoir 16 for the hot coating material, the material being supplied through a primary conduit 18 and feeder conduits 20, 20' under control of suitable flow control valves 24, 26, 26' through a filter unit 30, 30' to an extrusion nozzle 32, 32' having an orifice or slot having a transverse dimension typically in the range of about 0.005 inch to 0.010 inch onto the web 14 of material being coated.

The system is designed for continuous operation by use of filters incorporating the present invention which allow for rapid replacement of clogged filters and by selectively feeding the hot extrusion coating material through one filter unit 30 while the other 30' is being changed.

Figure 3:
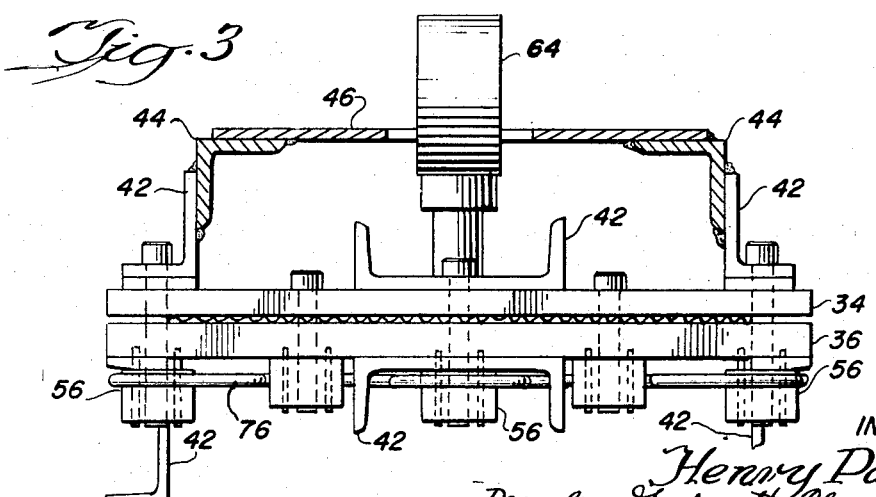
FIG. 3 is an end view of the filter unit.

A filter unit or strainer 30, as shown in FIGS. 2 and 3 includes a cover member 34 and a bottom 36 defining therebetween a closed cavity 38 through which is passed a continuous web of screen material 40. Extending across the cover and the bottom are a plurality of stiffening members 42 to provide sufficient strength to withstand the pressure developed within the cavity 38. As seen in FIG. 3, the cover 34 of the filter unit 10 may be attached to the apparatus with which it is being used (not shown) by means of suitable brackets 44 and a support plate 46.

The upper half of the cavity 38 is defined by a domed recess 48 formed in the cover, the periphery of which terminates in a circumferential sealing element, such as raised bead 50. The lower half of the cavity 38 is defined by a recess 52 formed in the bottom 36 of the filter unit 10. A plurality of screen support members 54, are supported within the bottom recess 52, typically spaced at 1 inch intervals, provide support for the screen 40. The cover and bottom are bolted together around their periphery by a plurality of clamping bolts 56. When the clamping bolts are tightened down, the circumferential bead in the cover engages a complementary sealing element, such as circumferential gasket 58 disposed adjacent the periphery of the bottom recess 52 to form the closed cavity 38.

The continuous screen 40 is supported on one side of the filter unit 30 and extends through the cavity 38, passing across the support wires 54 and between the circumferential bead 50 and gasket 58. A filter 60 is formed by that portion of the screen 40 disposed within the cavity 38, i.e., internally of the bead 50 and gasket 58 which operate to close and seal the cavity 38 as the clamping bolts 56 are tightened down.

The coating material is supplied to the cavity 38 through an inlet aperture 62 in the cover 34 to which is attached the conduit 20. The condition of the filter 60 may be monitored by a pressure gauge 64 fitted to a pressure aperture 66 in the cover 34 while a third aperture 68 may be connected to an air vent 70 or vacuum pump to purge the cavity 38 after the filter is changed.

The hot coating material passes through the filter 60 and out the bottom 36 of the strainer 30 through a discharge conduit 72 fitted to a centrally disposed discharge aperture 74 passing through through the bottom to the extrusion nozzle 32.

To facilitate passage of hot material through the strainer 30, a plurality of heating elements may be disposed adjacent the external surfaces either or both the cover 34 and/or the bottom 36. In the disclosed embodiment, continuous piping 76 is disposed adjacent to the external surface of the bottom 36 through which a heated fluid, e.g., hot oil, is pumped heat the strainer 30 to any desired temperature. This type of strainer heating arrangement system, which can alternatively take the form of steam lines, electric heating elements or any other suitable heating means, allows the filter system to be maintained at a desired temperature even though temporarily inactivated, thereby allowing it to be brought into operation at will.

In operation, the coating material is supplied to the nozzle through the filter at flow rates typically of about 2,500 pounds per hour and at temperatures of about 300° F to about 400° F. The utilization of the support wires 54 under the filter screen 60 allows a substantial pressure differential to build up across the filter without bursting of the screen such as a pressure differential of about 200 pounds per square inch across a screen with appropriately sized openings. In some extrusion operations, for example, the screen used consists of a 0.006 inch open wire mesh.

When the filter 60 becomes clogged, as indicated on the pressure gauge 64, and requires replacement, the supply of coating material is switched to an alternate unit by operation of the control valves 26, 26'. The clamping bolts 56 are loosened sufficiently to release the seal between the bead 50 and gasket 58 to free the filter screen 40 shown diagrammatically in FIGS. 5 and 6. The screen 40 is pulled through the cavity 38 until the clogged portion of the screen 40 is removed and another portion is in place, after which the clamping bolts 56 are tightened up. The used screen is cut away from the web such as by knife blades 74 and the filter unit 30 is ready for operation. As the coating material is reintroduced into the cavity, the vent 70 may be opened to purge the system until the entire cavity 38 is filled with hot material after which the outlet may be opened and passage of the material through the filter resumed.

Thus, there has been disclosed a system and method by which materials which contain undesired constituents such as constituents that ordinarily will clog or preclude satisfactory extrusion coating, are removed by use of a quick change filter material which allows for replacement of a clogged filter with clean material rapidly, simply, and without necessity of cooling down the filter unit. For example, when used in conjunction with extension coating apparatus, continuous operation of the unit is possible, even with materials such as asphalt when filter changes are required at regular intervals as short as every hour.

From the foregoing, it will be observed that numerous variations and modifications may be effected without departing from the true spirit and scope of the novel concept of the invention. It is, of course, intended to cover by the appended claims all such modifications as fall within the scope of the claims.

What is claimed is:

1. A filter system for removing constituents from hot fluid material continuously passing therethrough comprising: a filter unit having a cover member, a cover member affixed to said cover member and defining there between a closed cavity, inlet means connected to said cavity for conveying sad hot material to said cavity, and outlet means connected to said cavity for conveying filtered fluid material from said cavity;

a continuous screen extending through said closed cavity between said inlet and outlet means, said screen being of a mesh size to prevent passage therethrough of constituents of said hot fluid material having a size greater than about 0.01 inch; means supporting said screen in operative position within said cavity to permit a pressure differential thereacross of at least about 200 pounds per square inch; sealing means defining the periphery of said closed cavity; and means for causing said sealing means to engage said continuous screen and form a filter from the portion thereof disposed within said closed cavity and for disengaging said sealing means from said screen to permit movement thereof through said cavity until another portion thereof is disposed within said cavity; whereby re-engagement of said screen by said sealing means forms said filter from said other portion of said screen.

2. A system in accordance with claim 1 including means releasably affixing said bottom member to said cover member to cause said sealing elements to engage said screen and form said filter.

3. A system in accordance with claim 1 including means heating said filter unit and to facilitate passage of the hot fluid material therethrough at selected temperatures.

4. A system in accordance with claim 1 wherein said screen supporting means includes a plurality of intersecting members defining a grid.

5. A system in accordance with claim 4 wherein the spacing between adjacent support members is on the order of 1 inch.

6. A system in accordance with claim 1 wherein said sealing means includes complementary sealing elements disposed adjacent the periphery of said cavity in each of said members, one of said sealing elements including gasket means disposed in one of said members and the other of said sealing elements including a raised bead formed in the other of said members and engagable with said gasket means, said screen passing between said gasket means and said raised bead.

7. A system as claimed in claim 1 wherein said screen is of a mesh size to prevent passage therethrough of constituents of said hot fluid material having a size greater than about 0.005 inch.

8. A method for continuously filtering hot fluid material wherein said hot fluid material is selectively supplied to each of a plurality of filter units for removing therefrom constituents having a size greater than about 0.005 inch, including the steps of passing through each of said filter units a continuous web of screen material having a mesh size capable of preventing passage of said constituents therethrough; sealing a portion of said screen material within said filtering unit to form a filter therefrom; supporting said filter portion in operative position within said filtering unit to permit a pressure differential thereacross of at least about 200 pounds per square inch; supplying said hot fluid material to one of said filter units at a rate up to about 2,500 pounds per hour; selectively switching the supply of hot fluid material from said one unit to another of said units; releasing said screen material in said one unit while the temperature internally thereof is sufficiently high to maintain the fluid material in a fluid state; transporting said screen material through said one filter unit until the clogged portion thereof passes from said unit and another portion thereof is disposed therein; closing said filter system to seal another portion of said screen in said unit to form a filter therefrom, whereby said coating material may continuously be supplied through at least one of said filter units.

9. A method as claimed in claim 8 wherein said fluid material is asphalt supplied at a temperature of between about 300° F to about 400° F.

10. A method as claimed in claim 8 wherein said fluid material is polypropylene.

11. A method as claimed in claim 8 including the step of selectively externally heating each of said filter units to maintain said units at desired temperatures.

* * * * *